United States Patent [19]

Ensor

[11] Patent Number: 5,398,298
[45] Date of Patent: Mar. 14, 1995

[54] ACCELERATION CONTROLLER FOR LAUNDRY MACHINE MOTOR

[75] Inventor: David J. Ensor, Auckland, New Zealand

[73] Assignee: Fisher & Paykel Limited, Auckland, New Zealand

[21] Appl. No.: 198,478

[22] Filed: Feb. 18, 1994

Related U.S. Application Data

[63] Continuation-in-part of Ser. No. 810,385, Dec. 19, 1991, Pat. No. 5,341,452.

[30] Foreign Application Priority Data

Dec. 19, 1990 [NZ] New Zealand .................. 236543

[51] Int. Cl.[6] ............................................. H02P 5/17
[52] U.S. Cl. ................................. 388/811; 318/138; 318/254; 318/439; 318/281; 388/907.5
[58] Field of Search ............... 318/254, 138, 439, 280, 318/281-284, 286, 430, 443-445; 388/809-815, 907.5

[56] References Cited

U.S. PATENT DOCUMENTS

| | | | |
|---|---|---|---|
| 4,449,079 | 5/1984 | Erdman | 318/254 X |
| 4,540,941 | 8/1985 | Boyd, Jr. et al. | 318/254 X |
| 4,636,936 | 1/1987 | Boyd, Jr. et al. | 318/254 X |
| 4,642,536 | 2/1987 | Boyd, Jr. et al. | 318/254 X |
| 4,642,537 | 2/1987 | Young | 318/254 X |
| 4,654,566 | 3/1987 | Erdman | 318/254 X |
| 4,857,814 | 8/1989 | Duncan | 318/138 X |

*Primary Examiner*—Jonathan Wysocki
*Assistant Examiner*—David Martin
*Attorney, Agent, or Firm*—Trexler, Bushnell, Giangiorgi & Blackstone, Ltd.

[57] ABSTRACT

A method of cyclically accelerating an electric motor particularly for use in a laundry machine. A desired speed, direction of rotation and acceleration time is set and power is applied to the motor in a series of incremental steps, each successive step corresponding to an increase in the level of power applied during the previous step. The steps are initially estimated to be sufficient to enable sufficient energy to be supplied to the motor for it to reach the desired speed in the desired acceleration time. The speed of the motor is monitored and the steps of accelerating the motor are repeated with the series of incremental steps adjusted to adjust the supply of energy to the motor dependant on the speed reached in the acceleration time of the previous cycle.

14 Claims, 3 Drawing Sheets

: 1

ACCELERATION CONTROLLER FOR LAUNDRY MACHINE MOTOR

CROSS REFERENCE TO RELATED APPLICATION

This application is a Continuation-in-Part of USSN 07/810,385, filed Dec. 19, 1991, now U.S. Pat. No. 5,341,452.

FIELD OF THE INVENTION

This invention relates to controllers for electric motors and in particular but not solely to motor drive systems for laundry machines.

DESCRIPTION OF THE PRIOR ART

U.S. Pat. No. 4857814 (Duncan) discloses a laundry machine having sensing means for sensing the load on the agitator and means for controlling the agitator motor power to achieve a desired agitator velocity/time profile such that soil removal and washing activity remain substantially constant according to the desired setting for different loads. However it would be desirable to sense the load and adjust the power input to the motor accordingly so as to achieve a desired agitator speed time profile independent of actual load or user estimated load.

SUMMARY OF INVENTION

It is an object of the invention to provide a laundry machine motor controller which meets the above desideratum.

The invention consists in an electronic control means for cyclically controlling the supply of power to an electric motor having a rotor and a stator to perform cycles of accelerating said rotor to a plateau speed and bringing said motor to rest, said control means including a. power supply means provided to supply power to said motor at a desired rate;

b. speed setting means operable to set a desired speed of rotation of said rotor and a desired acceleration time for said motor from rest to said desired speed;

c. incremental step setting means to set an initial series of incremental steps, each successive step corresponding to an increase in the level of power supplied to said motor over the level of power supply reached in the previous step, said steps being estimated to be sufficient to enable sufficient energy to be supplied to said motor to reach said desired speed in said acceleration time;

d. speed determining means to determine the speed of said motor;

e. switching means to switch off the power supply to said motor;

f. adjusting means responsive to control signals from said speed determining means to adjust the number and/or size of said incremental steps to adjust the supply of energy to said motor to adjust the acceleration and thereby change said motor speed towards said desired speed during a next cycle of operations.

The invention further consists in a laundry machine having a laundry machine having a washing container, a spin tub and agitator within said container, said agitator being connected so as to be rotated back and forth by an electric motor and to be rotated with said spin tub when driven continuously in one direction, said machine including an electronic control means as described in the preceding paragraph.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

DESCRIPTION OF THE PREFERRED EMBODIMENTS

The present invention is an improvement to that disclosed and claimed in U.S. Pat. No. 4,857,814 the disclosure of which is incorporated herein by reference.

Figure 1:
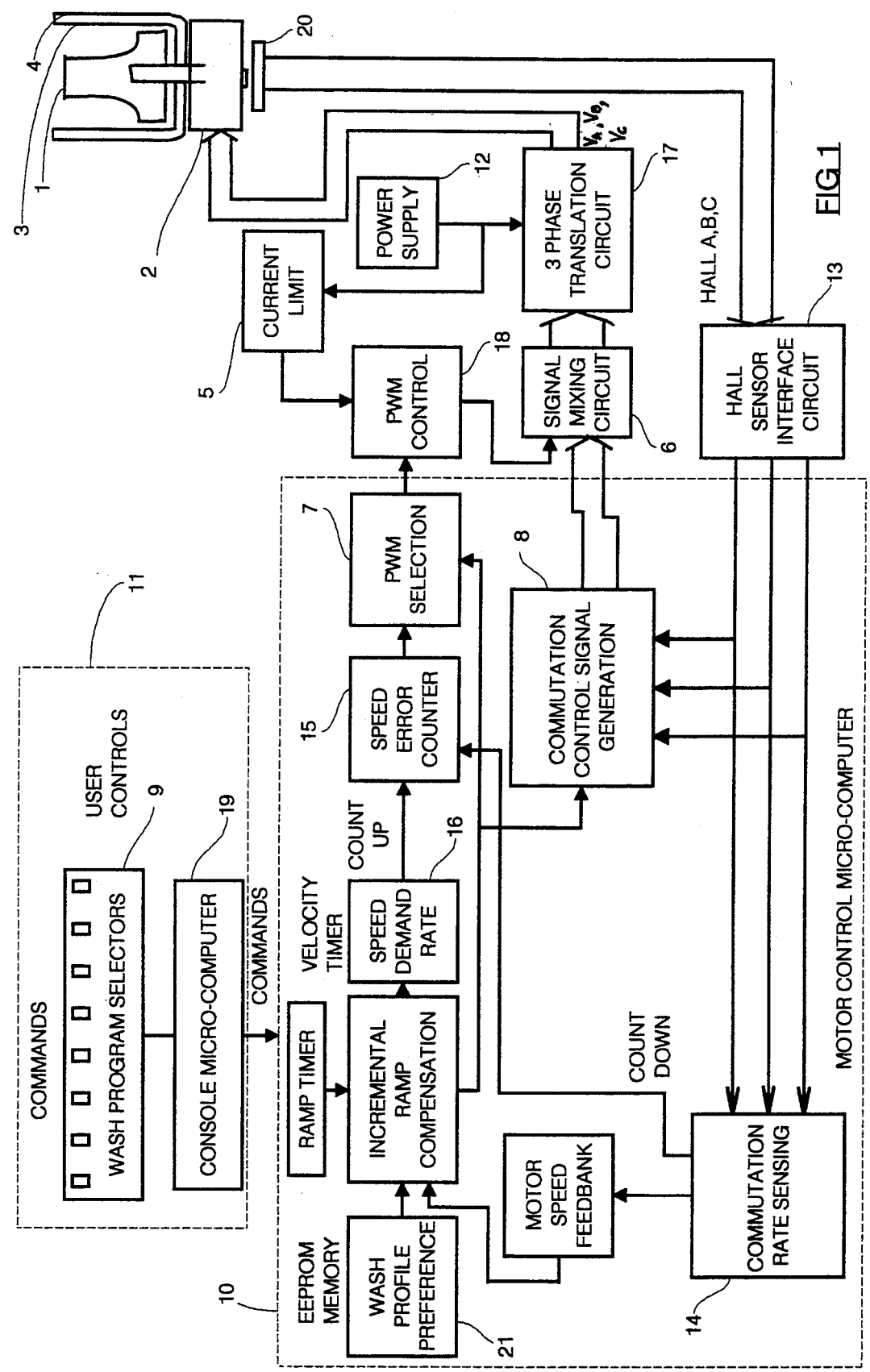
FIG. 1 is a block diagram of an electronic control circuit to control an electronically commutated motor driving an agitator and spin tub of a clothes washing machine which block diagram is modified according to the present invention.

Referring to FIG. 1, an electronically commutated motor (ECM) 2 is connected to the agitator 1 of a laundry machine having a washing container 4 and a spin tub within the container. The agitator is connected to the motor and spin tub so as to be rotated back and forth by the motor to provide an agitating action and is on demand, connected so as to be rotated with said spin tub when driven continuously in one direction during a spin cycle. A suitable mechanical drive system is described in U.S. Pat. No. 4,813,248.

The ECM 2 constitutes a stationary assembly comprising a stator having a plurality of windings adapted to be selectively commutated, and rotatable means associated with that stationary assembly in selective magnetic coupling relation with the winding stages. The winding stages are commutated without brushes by sensing the rotational position of the rotor as it rotates within the stationary assembly. DC voltage is selectively applied by commutation circuit, which comprises signal mixing circuit 6 and a high current three phase translation circuit 17, to the winding stages in preselected orders of sequences leaving at least one of the winding stages unpowered at any one time while the other winding stages are powered in response to a pattern of input signals from a rotor position indicating interface circuit 13.

Motor commutation is controlled by a general purpose microcomputer 10, for example a National COP800. The motor controller comprises console mounted circuits 11, a programmed microcomputer 10, electronic drive circuits which supply power to motor 2 and motor sensor circuits which provide feedback to microcomputer 10. The blocks shown in FIG. 1 within the dotted lines 10 represent hardware elements, such as memory, or functions performed by the microprocessor software.

Microcomputer 10 receives input commands from a console 11 having a series of push buttons 9. These inputs cause data representing an agitator velocity profile (see FIGS. 4 to 8) to be selected from memory 21 which ultimately determine the microcomputer output which sets a pulse width modulation controller 18. Output from the PWM controller 18 is mixed with the low level three phase commutation signals outputted by software function 8 in mixer 6 to control the duty cycle of each phase signal pulse train fed to high power bridge circuit 17. The necessary power is supplied by a DC power supply 12.

In order to detect the instantaneous angular position of the rotor relative to the stator to permit commutation, Hall effect sensors 20 are positioned adjacent to the stator windings to provide electrical signals indicative of rotor position. These are fed to inputs of microcomputer 10 via interface circuit 13.

A current sensing circuit 5 supplies signals to PWM control 18 to reduce the PWM duty cycle when current exceeds a predetermined maximum. Loop position error indicator functions 15, a speed demand rate velocity timer function 16 and a commutation rate sensing function 14 are provided in the microcomputer software.

A washing machine controlled by the hardware and software previously described functions as follows. The operator selects a desired set of washing requirements by operating push buttons 9 controlling its console microcomputer 19. As a result the console microcomputer 19 sends a series of data values to the motor control microcomputer 10 and these are placed into registers (memory locations) of the same name, in the motor control microcomputer 10. Data transmitted from the console is broken up into 3 groups:

Group 1 contains the command words:
01H-BRAKE
01H-WASH
02H-SPIN
03H-TEST
04H-MODIFY
05H-STOP
06H-STOP
07H-PUMP
Group 2 contains error codes:
08H-PARAMETER range error detected
09H-PARITY error detected
0AH-COMMAND error detected
Group 3 contains parameter data:
0BH to 7FH The motor control microcomputer software knows which group to expect during each communication, therefore if the program has got out of step with the console in any way this will be picked up as a range error.

However due to this data structure some data in group 3 may be outside their working range so within the listing some parameters are offset after they have been received so that they fall within the correct value to be used within the program.

To maintain function overviews, at the beginning of the wash cycle the console microcomputer 19 controls the filling of the bowl. While the bowl is filling a spin command is sent to the motor control microcomputer. The spin speed is very low, approximately 70 rpm, and its main purpose is to mix the soap powder while the bowl is being filled. Once the bowl is filled the console then sends a WASH command to the motor controller 10 to start the agitate cycle. This agitate cycle starts from rest, ramps up to speed, maintains this speed for a predetermined time and then coats to a stop all within one forward or reverse cycle of the agitator. Once the agitator has stopped the process is repeated in the opposite direction thus producing an agitating motion. The console microcomputer 19 determines all these parameters which determine what sort of wash is required e.g. gentle cycle, and cause the appropriate data to be selected from memory 21 before the start of the cycle.

The motor controller 10 continually modifies these wash parameters to account for the load in order to maintain the most effective dirt removal to gentleness ratio. Because of the agitating motion the load is shuffled around the bowl and this affects how fast the agitator ramps to speed and how long it takes to come to a stop at the end of the stroke. Therefore to maintain constant wash effectiveness these parameters are monitored and modified each stroke cycle to at least attempt to maintain the ideal conditions requested by the console microcomputer.

The motor controller 10 will continue this action until it receives another command from the console microcomputer. In a little more detail, the wash mode runs as follows.

On receiving a "WASH" command a jump is made to the WASH routine. Low speed windings of the motor are set and a brake is set off. The routine then waits for the Console microcomputer to end the wash cycle parameters, i.e.:

(1) TSTROKE The time for rotation of the agitator in one direction.
(2) WRAMP The time it takes to reach speed from rest.
(3) ENDSPD The velocity which the agitator must reach after the wash ramp time is up.

When these have been placed in the appropriate registers they are then checked for errors. Checks for other errors are also made including a check to make sure the motor is stationary.

A routine now sets LORATE=ENDSPD=ACCSPD. LORATE is the motor speed, ACCSPD is the speed that the motor must reach to obtain the correct wash ramp rate. ACCSPD may become greater than ENDSPD to achieve the correct acceleration ramp.

The speed rate timer RATETMR used in the timer interrupt routine for the speed reference count is loaded with the count set in LORATE previously.

The position error counter 15 is cleared and current trip and pattern error circuits are reset. In the wash mode the program by passes the spin cycle routine.

At this point the plateau time, TFLAT, is calculated from the wash profile data. To do this it sets the coast time at 180 ms. This is the time chosen which guarantees that the motor will have coasted to a stop with very little load. Thus the plateau time is calculated;

TFLAT=TSTROKE-WRAMP-15 (180 ms time count) using a longer timer a count of 15 gives:

$$127 \times 96 \ \mu s \times 15 = 180 \ ms \ (approx).$$

The routines up to this point have only been setting the wash parameters for the first stroke. The following values as referred to above, are set in the random access memory in the motor control microcomputer 10:

TSTROKE total stroke time, i.e. from rest to peak speed and to rest again.
WRAMP time to full speed
ENDSPD full speed count
LORATE (set at ENDSPD) speed rate
ACCSPD (set at ENDSPD) acceleration rate
ALGFLG (set FALSE) end of ramp flag ENDFLG (set FALSE) plateau time flag
SLECTR position error counter
RATETMR (set at LORATE) sets speed reference to speed loop error counter
TFLAT calculated from above parameters; time at maximum speed At this point the wash cycle can begin.

The present invention is firstly concerned with a means of controlling the ramp up to speed section of each agitator stroke. Power is supplied to the motor using pulse width modulation to control input energy and thus motor torque. A pulse width modulation period is provided during which current is supplied to the motor for a predetermined "on" time and power is removed from the motor during a predetermined "off" time, the "on" time and the "off" time together making up the modulation period. The duty cycle or PWM rate is increased by increasing the duration of the "on" time relative to the "off" time in each modulation period.

Figure 2:
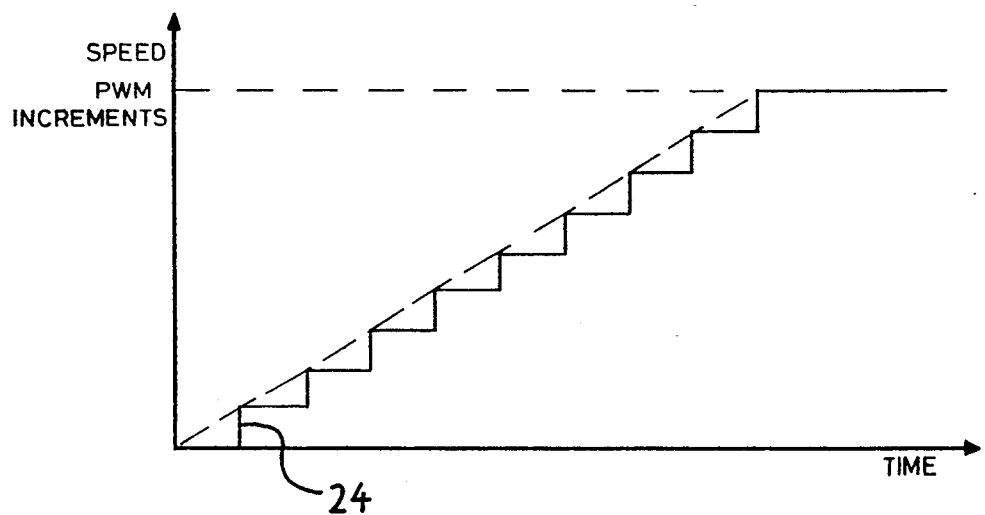
FIGS. 2 and 3 are graphs showing agitator speed against time during the ramp up to speed phase with agitator energy increments shown outlined in diagrammatic form.

The agitator rotational acceleration is controlled by controlling the increase of PWM rate and hence the torque of the motor. In FIG. 2 the angular speed is shown diagrammatically as increasing in discrete steps 24, each step corresponding to an increase in PWM rate. At the end of the ramp period the speed is measured and the PWM rate is adjusted up or down, depending on whether the measured speed is too low or too high.

The agitator acceleration can be controlled in the present invention independent of the stroke length or agitation period. Regardless of how fast the agitation period is it is possible to have any ramp up period from e.g. 80 ms–400 ms. This adds an extra variable to control the wash performance and also a control on how the wash profile looks to the user-very long ramps make the wash stroke look slow and soft.

Figure 3:
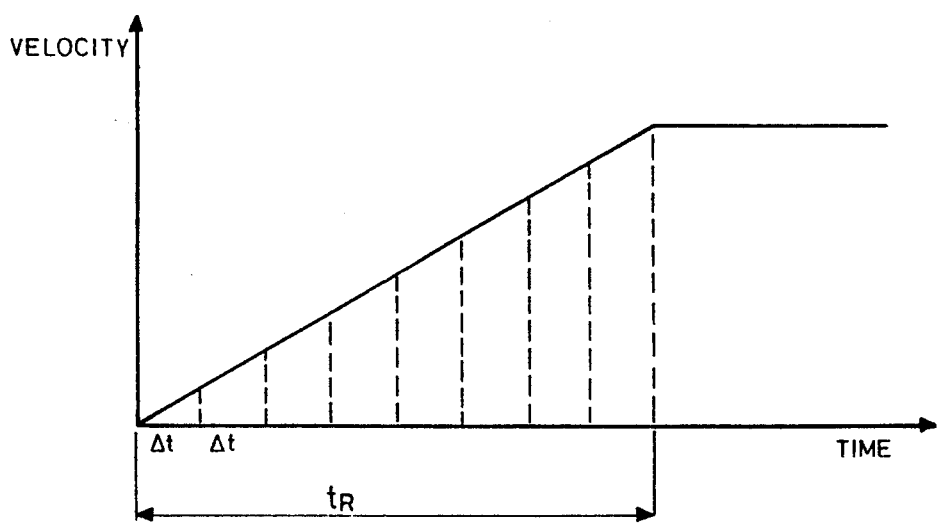

Referring to FIG. 3, PWM is incremented every $\Delta t$ in a series of incremental steps. Therefore the smaller $\Delta t$ is the more the PWM is incremented and thus the more power is supplied to the motor.

$\Delta t$ is determined by defining the ramp time $t_R$ and the number of PWM rate increments (called steps).

$$\therefore \Delta t = \frac{t_R}{\text{STEPS}}$$

e.g.

$$t_R = 100 \text{ ms}, \text{STEPS} = 16 \rightarrow \Delta t = \frac{100 \text{ ms}}{16} = 6.25 \text{ ms}$$

$$t_R = 400 \text{ ms}, \text{STEPS} = 16 \rightarrow \Delta t = \frac{400 \text{ ms}}{16} = 25 \text{ ms}$$

So in order to have the same number of incremental steps from one ramp time, $t_R$, to another, the time between successive steps must vary depending on $t_R$. In this manner it is possible to control the motion of the motor (and agitator) so that it will reach desired speed in time $t_R$.

The load on the motor will not always be the same due to varying wash loads, and it is not possible to predetermine the number of incremental steps in order to obtain the correct speed within time $t_R$.

For example, if the load in the machine is very light then only a small amount of power to the motor is needed to accelerate it to speed in time $t_R$. With a heavy load more power will obviously be required. The amount of power that can be supplied to accelerate the motor to desired speed in time $t_R$ is proportional to the rate of increase of the incremental steps.

For example a light load may only require say 6 incremental steps to accelerate the motor to a desired speed in a desired acceleration time e.g. 100 ms whereas a heavy load may require say 62 steps (i.e. almost full PWM, the maximum PWM steps being 64) to reach the same speed in 100 ms. The motor speed is monitored by speed determining means comprising part of the motor control means.

In order to achieve this the software must monitor the performance of each ramp cycle and adjust the PWM rates using incremental step setting means for the next stroke.

The software parameters are calculated in the following manner:

As stated the maximum number of PWM steps is 64.
The microprocessor timer base is 162 $\mu$s.

If 64 steps are not required then we must add multiples of above timer counts. e.g. ramp of 100 ms.

a ramp of 100 ms $$\rightarrow \text{each step} = \frac{100 \text{ ms}}{64} = 1.56 \text{ ms}$$

$$\therefore \text{RAMP} = \frac{1.56 \text{ ms}}{162 \mu s} = 10 \text{ microprocessor timer intervals}$$

a ramp or 400 ms $$\rightarrow \text{each step} = \frac{400 \text{ ms}}{64} = 6.25 \text{ ms}$$

$$\therefore \text{RAMP} = \frac{6.25 \text{ ms}}{162 \mu s} = 39 \text{ microprocessor timer intervals}$$

If 64 steps are not required then multiples of above timer counts must be added. e.g. ramp of 100 ms
If want 16 steps instead of 64 then $$\text{each step} = \frac{100 \text{ ms}}{16} = 6.25 \text{ ms}$$

$$\therefore \frac{6.25 \text{ ms}}{1.56 \text{ ms}} = 4 \therefore \text{must count 4 lots of RAMP}$$

ramp of 400 ms
If want 16 steps instead of 64 then each step = 25 ms $$\therefore \frac{25 \text{ ms}}{6.25 \text{ ms}} = 4 \therefore \text{must count 4 lots of RAMP}$$

Notice that for a ramp of 100 ms or 400 ms this multiplying factor remains the same and simply defines the number of steps in the ramp. The count labelled RAMP varies with ramp time, so that is the variable that defines total ramp time.

equation(1)
$$\therefore \text{RAMP} = \frac{(\text{RAMP TIME})}{(\text{TOTAL COUNTS})} / \text{TIME BASE}$$

equation (2)
$$\text{COUNTS} = \frac{(\text{RAMP TIME})}{(\text{STEPS})} / \frac{(\text{RAMP TIME})}{(\text{TOTAL COUNTS})}$$

$$= \frac{(\text{TOTAL COUNTS})}{(\text{STEPS})}$$

i.e. Ratio of max steps to required steps.

The two variables RAMP and COUNT above are two registers which make up a timer in the microprocessor code with a base time of 162 μs. The count store in RAMP is decremented every 162 μs and upon reaching zero count the value in COUNTS is decremented. RAMP is reloaded every time it reaches zero.

e.g. if RAMP=10 then COUNTS is decremented every 10 ×162 μs=1.62 ms.

Once COUNTS reaches zero the PWM is incremented in a further incremental step and the process is repeated until total ramp time is up.

Total ramp time is determined by adding the value in COUNTS every PWM step. Since COUNTS is a ratio of the number of required PWM steps to total PWM steps then when the sum of COUNTS after each step is equal to total PWM steps total ramp time has been reached. i.e. COUNTS+COUNTS$_2$+COUNTS$_3$+ ... +COUNTS$_{STEPS}$=TOTAL COUNT Σ(COUNTS)-=TOTAL COUNT e.g. RAMP TIME=100 ms
STEPS=16, TOTAL COUNTS=64

$$\therefore \text{COUNTS} = \frac{64}{16} = 4$$

$$\therefore \text{RAMP} = \frac{(100 \text{ ms})}{64} \times \frac{1}{162} = 10$$

This means that every 10×(TIME BASE)=10×162 μs COUNTS will be decremented.

When COUNTS=0 then the PWM will be increased by one count.

∴ PWM increase every (10×162 μs)×4=6.48 ms
∴ Total ramp time is (STEPS×6.48 ms)=16×6.48 ms=104 ms Software measures ramp time as
COUNTS+COUNTS2+ ... +COUNTS$_{STEPS}$
$4+4_2+4_3+ ... +4_{16}=64$ When the sum of all the COUNTS reaches total count then that is the end of RAMP.

Because it is not known what load will be put into the machine at any one time, the software must adjust the RAMP variables to achieve the desired ramp acceleration. Also, the maximum number of PWM steps (TOTAL COUNTS) may be varied to achieve the desired ramp acceleration so that the PWM rate is increased in successive incremental steps.

The number of steps are initially preset to a minimum using setting means so that no adjustment is needed for very light loads.

The speed at the end of the ramp period is monitored and if it is found to be under speed then the register COUNTS is decremented. This effectively increases the number of PWM steps, and hence the power to the motor, within the ramp time period.

It can be seen from equation (2) that by decreasing COUNTS by 1 does not correspondingly increase the number of steps by 1, i.e. the relationship is not linear.

Also it can be seen from equation (2) that the PWM step resolution can be changed by altering the radio.

$$\frac{\text{TOTAL COUNTS}}{\text{STEPS}}$$

i.e. Increasing TOTAL COUNTS will increase the resolution in PWM steps.

However by increasing the STEP resolution the RAMP TIME resolution is decreased.

The best compromise has been found to be the following

RAMP TIME INCREMENTS = 20 ms
TOTAL COUNTS = 123
STEPS = 5-62
Σ COUNTS >120

$$\therefore \text{equation (1)} \rightarrow \text{RAMP} = \frac{\text{RAMP TIME}}{123 \times 162 \text{ μs}} = \frac{\text{RAMP TIME}}{20 \text{ ms}}$$

$$\text{equation (2)} \rightarrow \text{COUNTS} = \frac{123}{\text{STEPS}}$$

Figure 4:
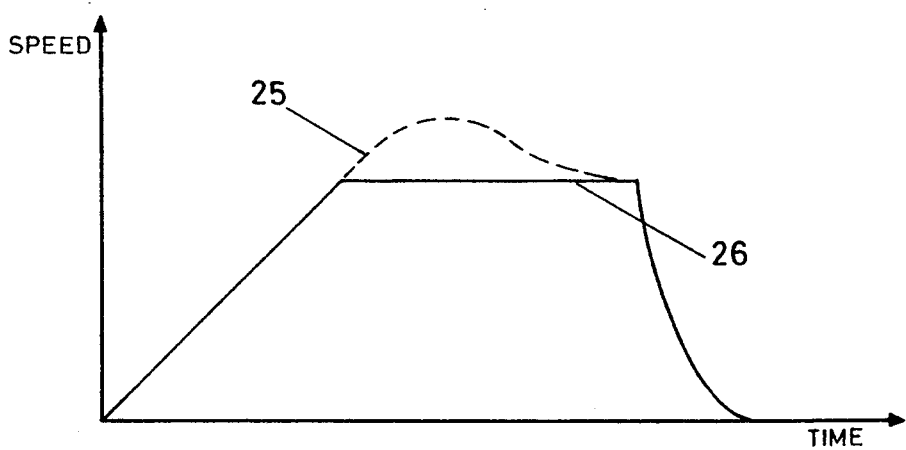
FIGS. 4 to 8 are agitator angular speed against time graphs (agitator profiles) showing features of the invention in preferred forms of the invention.
Figure 5:
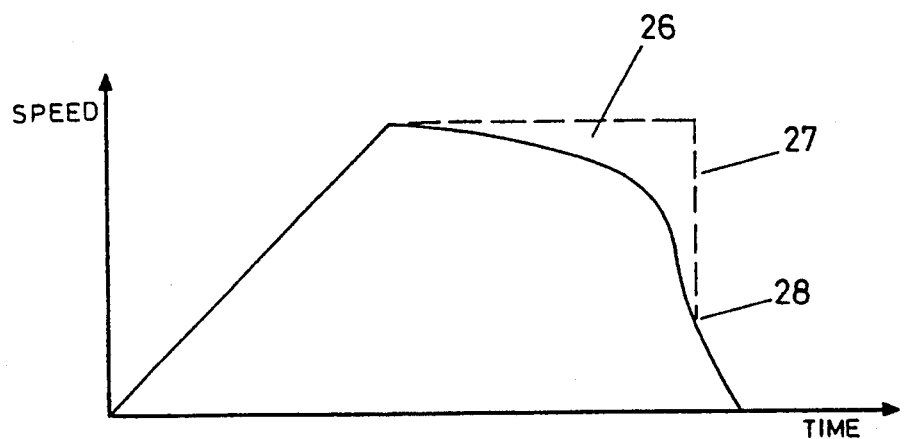

At least in the preferred form the invention also envisages control of the plateau region of the agitator velocity profile and of overshoot, illustrated at 25 in FIG. 4 either in combination with or separate from the above described acceleration control. Ideally, in the plateau region 26, a constant speed is maintained for a desired plateau time period. Thus the need for overshoot control in the plateau region 26 of the wash performance profile is particularly relevant at heavy loads. At extremely heavy loads the wash profile cannot be maintained due to torque constraints on the motor. The region that cannot be maintained is the plateau region 26 of the ideal profile 27 (FIG. 5). With very heavy loads the actual profile 28 has an area under it which is greatly reduced and hence the overall wash performance is also reduced. The motor torque constraints can be compensated by software techniques to improve the area under this graph.

Under most conditions the load on the agitator is not normally its heaviest until approximately half way through the stroke i.e. half way through the plateau region. As the load in the bowl is increased the tail end of the plateau region begins to deteriorate until with extreme loads about ¾ of the plateau region is under speed.

Figure 6:
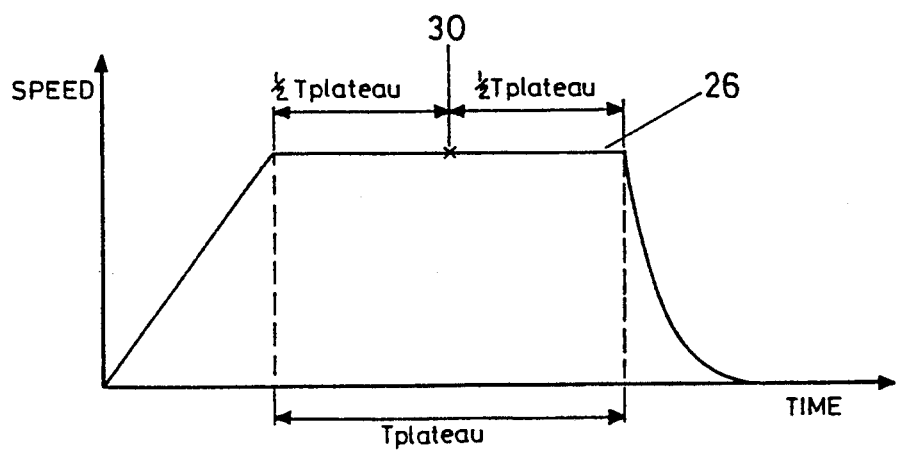

To overcome this problem the software monitors the plateau region speed and if underspeed, controls the ramp up to produce a degree of initial overshoot. Through experimentation it has been found that the best point to measure the speed and determine when to add or subtract compensation is at the mid point 30 of the plateau region as is illustrated in FIG. 6.

By moving this measuring point backwards or forwards in time varying degrees of overshoot compensation can be used. By moving the point forward, i.e. later in time, compensation can be added with lighter loads than if the point is moved backwards i.e. earlier in time.

Figure 7:
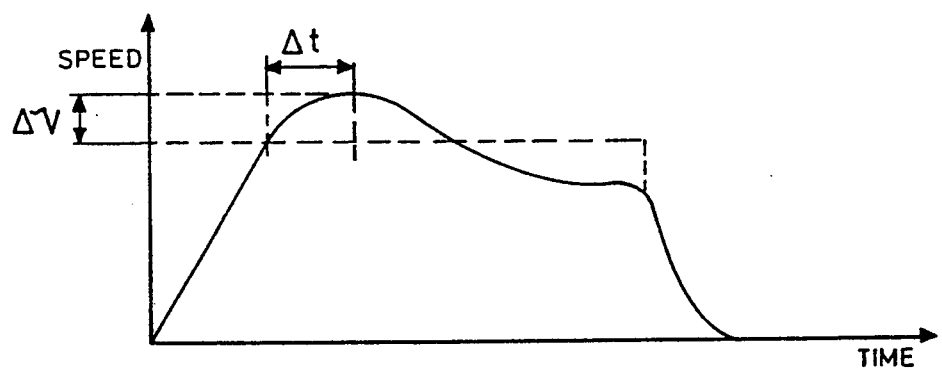
Figure 8:
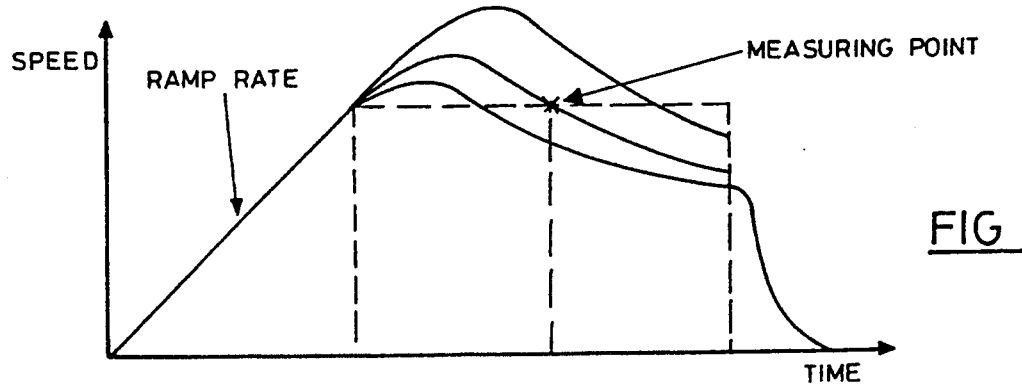

If the measuring point indicates a speed that is under the desired speed then on the next stroke cycle at the end of the ramp period the software will increase the plateau speed by $\Delta v$ for a predetermined time, $\Delta t$, as seen in FIG. 7. As the load increases, the compensation must also increase. The first parameter that is increased is the overshoot time, $\Delta t$. This is increased until either speed is correct at the measuring point or, $\Delta t$= plateau time ($\Delta v$ has an initial set value which is not zero).

If $\Delta t$= plateau time and speed at the measuring point is still under desired speed i.e. load is very heavy, then the overshoot speed $\Delta v$ is increased until a preset limit is reached or the speed at measuring point is correct.

If however the load is so great (for example, say, 7 kg in a larger model laundry machine) that when maximum overshoot compensation has been reached and the underspeed is still detected at the measuring point then the ramp rate is also increased as described above in relation to acceleration ramp control.

This overshoot compensation is being constantly monitored and reduction can be effected e.g. if for some reason the clothes were initially bunched up around the agitator giving the appearance of a heavy load but were slowly freed due to the agitate action.

Compensation is preferably programmed to be added or reduced slowly so that the system does not oscillate and give erratic results.

At the end of the constant speed plateau region the power to the motor is turned off and the motor 2 is allowed to coast before power is applied to reverse the direction of rotation of the motor and hence agitator 1 using reversing means. The software monitors this coast period and a normal coast to zero speed time is 180 ms. If the time is greater than approximately 300 ms the software assumes that there is either too much load in the bowl for which a reasonable wash action is not possible or that the spin tub has for some reason re-engaged its clutch mechanism in which case further agitation will result in damage to the mechanical system.

The software will, on the receipt of a long coast period in both directions consecutively, signal an overload error to the user. When the water container is emptied of water as a preparatory step to spinning, a check is made on the load to see if the clutch between the agitator and the spin tub has engaged so that spinning of both agitator and spin tub can commence. Similarly, the spin tub and agitator are tested for disengagement before agitation commences. Disengagement of the clutch when filling with water is already disclosed in U.S. Pat. No. 48,131,248.

We claim:

1. An electronic control means for cyclically controlling the supply of power to an electric motor having a rotor and a stator to perform cycles of accelerating said rotor to a maximum speed and bringing said motor to rest, said control means including
   a. power supply means provided to supply power to said motor at a desired rate;
   b. speed setting means operable to set a desired speed of rotation of said rotor and a desired acceleration time for said motor from rest to said desired speed;
   c. incremental step setting means to set an initial series of incremental steps, each successive step corresponding to an increase in the level of power supplied to said motor over the level of power supply reached in the previous step, said steps being estimated to be sufficient to enable sufficient energy to be supplied to said motor to reach said desired speed in said acceleration time;
   d. speed determining means to determine the speed of said motor;
   e. switching means to switch off the power supply to said motor;
   f. adjusting means responsive to control signals from said speed determining means to adjust the number and/or size of said incremental steps to adjust the supply of energy to said motor to adjust the acceleration and thereby change said motor speed towards said desired speed during a next cycle of operations.

2. An electronic control means as claimed in claim 1 which includes reversing means for reversing the direction of rotation of said motor so that said motor rotates in succeeding cycles of forward and reverse directions.

3. An electronic control means as claimed in claim 2 wherein said incremental step setting means increase the level of power applied to said motor in each said incremental step if said desired speed is not reached when the acceleration time of the previous cycle elapses and decreasing the level of power applied in each said incremental step if the speed of said motor is greater than said desired speed when the acceleration time of the previous cycle elapses.

4. An electronic control means as claimed in claim 1 including timer means for determining the length of time of each said incremental step being the length of time for which each successive increase in the power supplied to said motor is maintained.

5. An electronic control means as claimed in claim 1 wherein said incremental step setting means increase the number of said incremental steps in said acceleration time if said desired speed is not reached when the acceleration time of the previous cycle elapses and decrease the number of incremental steps if the speed of said motor is greater than said desired speed when the acceleration time of the previous cycle elapses.

6. An electronic control means as claimed in claim 1 wherein said power supply means include pulse width modulation (PWM) means for supplying power to said motor in discrete pulses and supplying said pulses at a desired PWM rate and increasing the PWM rate in successive said incremental steps to increase the power supplied to said motor.

7. An electronic control means as claimed in claim 1 being used in a laundry machine having a washing container, a spin tub and agitator within said container, said agitator being connected so as to be rotated back and forth by an electric motor and to be rotated with said spin tub when driven continuously in one direction.

8. An electronic control means as claimed in claim 1 wherein said speed determining means monitor the speed of said motor during a plateau time being the time period after said acceleration time has elapsed and before the time said power supply is removed from said motor.

9. An electronic control means as claimed in claim 8 including power supply maintaining means for maintaining the supply of power to said motor for said plateau time.

10. An electronic control means as claimed in claim 8 wherein said adjustment means adjust the power supplied during said plateau time so that the speed of said motor is maintained as close as possible to said desired speed within the torque limit of the motor.

11. An electronic control means as claimed in claim 8 wherein said speed determining means monitor the speed of said motor at a time approximately mid way through said plateau time.

12. An electronic control means as claimed in claim 8 wherein said setting means increase said desired speed if the speed of said motor during said plateau time of the previous cycle is less than the desired speed in the previous cycle.

13. An electronic control means as claimed in claim 8 wherein said setting means increase said acceleration time if the speed of said motor during said plateau time of the previous cycle is less than the desired speed in the previous cycle.

14. An electronic control means as claimed in claim 8 wherein said incremental step setting means increase the number of said incremental steps to supply more power to the motor during said acceleration time if the speed of said motor during said plateau time of the previous cycle is less than said desired speed in the previous cycle.

* * * * *